US007231426B1

(12) United States Patent
Hall et al.

(10) Patent No.: US 7,231,426 B1
(45) Date of Patent: Jun. 12, 2007

(54) SYSTEM AND METHOD FOR SENDING A WEB PAGE VIA ELECTRONIC MAIL

(75) Inventors: Gabriel J. Hall, Woodinville, WA (US); Alan Ramaley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 09/577,909

(22) Filed: May 24, 2000

(51) Int. Cl.
*G06F 15/16* (2006.01)

(52) U.S. Cl. .................................... 709/206; 709/204
(58) Field of Classification Search ................ 709/200, 709/204–207
See application file for complete search history.

(56) References Cited

U.S. PATENT DOCUMENTS

| | | | | | |
|---|---|---|---|---|---|
| 5,710,883 | A | * | 1/1998 | Hong et al. | 709/246 |
| 5,937,160 | A | * | 8/1999 | Davis et al. | 709/203 |
| 6,078,921 | A | * | 6/2000 | Kelley | 707/10 |
| 6,163,779 | A | * | 12/2000 | Mantha et al. | 707/100 |
| 6,205,432 | B1 | * | 3/2001 | Gabbard et al. | 705/14 |
| 6,226,655 | B1 | * | 5/2001 | Borman et al. | 715/501.1 |
| 6,250,930 | B1 | * | 6/2001 | Mintz | 434/323 |
| 6,496,849 | B1 | * | 12/2002 | Hanson et al. | 709/200 |
| 6,519,646 | B1 | * | 2/2003 | Gupta et al. | 709/229 |
| 6,539,354 | B1 | * | 3/2003 | Sutton et al. | 704/260 |

* cited by examiner

*Primary Examiner*—David Wiley
*Assistant Examiner*—David England
(74) *Attorney, Agent, or Firm*—Merchant & Gould, P.C.

(57) ABSTRACT

An email client is configured to watch for attachment events and to automatically package a web page as a single-file attachment to an email note. When an attachment event is recognized by the email client, a determination is made as to whether the attached file is an HTML document. If the attached document is an HTML document, then a determination is made as to whether the HTML document has supporting resource files. If the HTML file has supporting resource files, then the registry is checked to see if the user has specified to include all supporting resource files with any HTML attachment. If not, then the user is prompted by a dialog box to select whether the supporting resource files should be attached. If the user expresses a desire to have the supporting resource files attached then the web page and all supporting resource files are packaged into a single file in Web Archive (e.g., MHTML) format. This single file is attached to the email note and transmitted with the email note to the recipient. The recipient will be able to unpack the attachment so that the web page can be displayed in its original form.

35 Claims, 6 Drawing Sheets

SYSTEM AND METHOD FOR SENDING A WEB PAGE VIA ELECTRONIC MAIL

TECHNICAL FIELD

The present invention relates to a system and method for transmitting web pages, and more particularly relates to a system and method for packaging a web page for transmission via electronic mail (email) such that the received web page is functional because it is delivered with all of the web page's supporting resource files.

BACKGROUND OF THE INVENTION

Electronic mail (email) processing is the primary use of the Internet today. Modern Internet users desire to send web page information to others via email. For example, a user may wish to send another person a web page that the user is constructing for the purposes of soliciting the recipient's comments. The attachment of a web page to an email note is difficult at best.

A typical web page consists of a main HTML (Hypertext Markup Language) source file and a host of resource files, such as graphics files, sound files, etc. Often, resource files are maintained within a predetermined folder structure and the main HTML source document includes links to the locations of the resource files within that folder structure. Because any given resource file may be in a folder that is different than the folder containing the main HTML document, the links in the HTML document will not be accurate, unless the resource files are maintained in the predefined folder structure. If the links are not accurate, then the web page will not function, because the aspects of the web page supported by linked content (e.g., graphics resource files) will not be supported by links to the resource files' actual locations.

When a web page is sent as an attachment to an email note, the folder structure and/or resource files may not be transmitted to the recipient. No currently available email client supports attaching a folder to an email note. Thus, if a user wishes to send a web page via email the user must attach the main HTML source file as well as each resource file corresponding to a link in the main HTML source file. Unfortunately, the folder structure of the web page will be lost and if the links point to resource files in folders other than that containing the main HTML document, then the web page will not be properly displayable. That is, the web page will not be functional.

Various approaches exist for packing web pages into a single file that can be attached to an email note, so that an email recipient can extract and display the web page in its original form. However, none of these approaches provides an automatic means for sending a web page via email.

Therefore, there is a need in the art for a process for attaching a web page to an email note, so that the web page's resource file folder structure is maintained, such that the web page can be displayed in its original form. The process should be automatic, so that the user can attach the complete web page by simply dragging the main HTML document into the email note.

SUMMARY OF THE INVENTION

The present invention satisfies the above-described needs by providing a system and method for automatically packaging a web page as a single-file attachment to an email note. An email client is configured to watch for attachment events. When an attachment event is recognized by the email client, a determination is made as to whether the attached file is an HTML document. If the attached document is an HTML document, then a determination is made as to whether the HTML document has supporting resource files. If not, then the HTML file is simply attached as is. If the HTML file has supporting resource files, then the registry is checked to see if the user has specified to include supporting resource files with HTML attachment. If not, then the user is prompted by a dialog box to select whether the supporting resource files should be attached.

If the user expresses a desire to have the supporting resource files attached then the web page and all supporting resource files are packaged into a single file, such as in MHTML (Multipurpose Internet Mail Extensions encapsulated HTML) format. This single file is attached to the email note and transmitted with the email note to the recipient. The recipient will be able to unpack the attachment so that the web page can be displayed in its original, functioning form.

In one aspect of the present invention, a method is provided for automatically attaching a web page and its resource files as a single file to an email note. When an attachment event is detected, a determination is made as to whether the file selected for attachment is a web page. If the selected file is a web page a determination is made as to whether the selected file includes one or more links to a resource file. If the selected file includes at least one link to a resource file, the selected file and the resource file is packed into a single attachment file and the attachment file is attached to the email note.

In another aspect of the present invention, a method is provided for automatically attaching a web page as a single file to an email note. A determination is made that a user desires to attach a selected file to the email note. A second determination is made as to whether the selected file is a web page. If the selected file is a web page, a determination is made as to whether the selected file includes at least one link to at least one resource file. If the selected file includes a link to a resource file, a determination is made as to whether automatic attachment of the at least one resource file has been authorized. If the automatic attachment has been authorized, the selected file and the at least one resource file are packed into a single attachment file and the attachment file is attached to the email note.

In yet another aspect of the invention, a system is provided for automatically attaching a web page as a single file to an email note. An email client is provided for generating and transmitting an email note. A web page is provided with at least one link to at least one resource file. A web page packing object is also provided and is operative to pack the web page and at least one resource file into a single web archive file. The email client is further operative to detect the attachment of the web page to the email note and to automatically trigger the web page packing object to pack the web page and at least one resource file into the single web archive file.

The various aspects of the present invention may be more clearly understood and appreciated from a review of the following detailed description of the disclosed embodiments and by reference to the drawings and claims.

DETAILED DESCRIPTION

The present invention satisfies the above-described needs by providing a system and method for automatically packaging a web page as a single-file attachment to an email note. An email client is configured to watch for attachment events. When an attachment event is recognized by the email client, a determination is made as to whether the attached file is an HTML document. If the attached document is an HTML document, then a determination is made as to whether the HTML document has supporting resource files. If not, then the HTML file is simply attached as is. If the HTML file has supporting resource files, then the registry is checked to see if the user has specified to include all supporting resource files with any HTML attachment. If not, then the user is prompted by a dialog box to select whether the supporting resource files should be attached.

If the user expresses a desire to have the supporting resource files attached then the web page and all supporting resource files are packaged into a single file in MHTML (Multipurpose Internet Mail Extensions encapsulated HTML) format. This single file is attached to the email note and transmitted with the email note to the recipient. The recipient will be able to unpack the attachment so that the web page can be displayed in its original form.

An Exemplary Operating Environment

Figure 1:
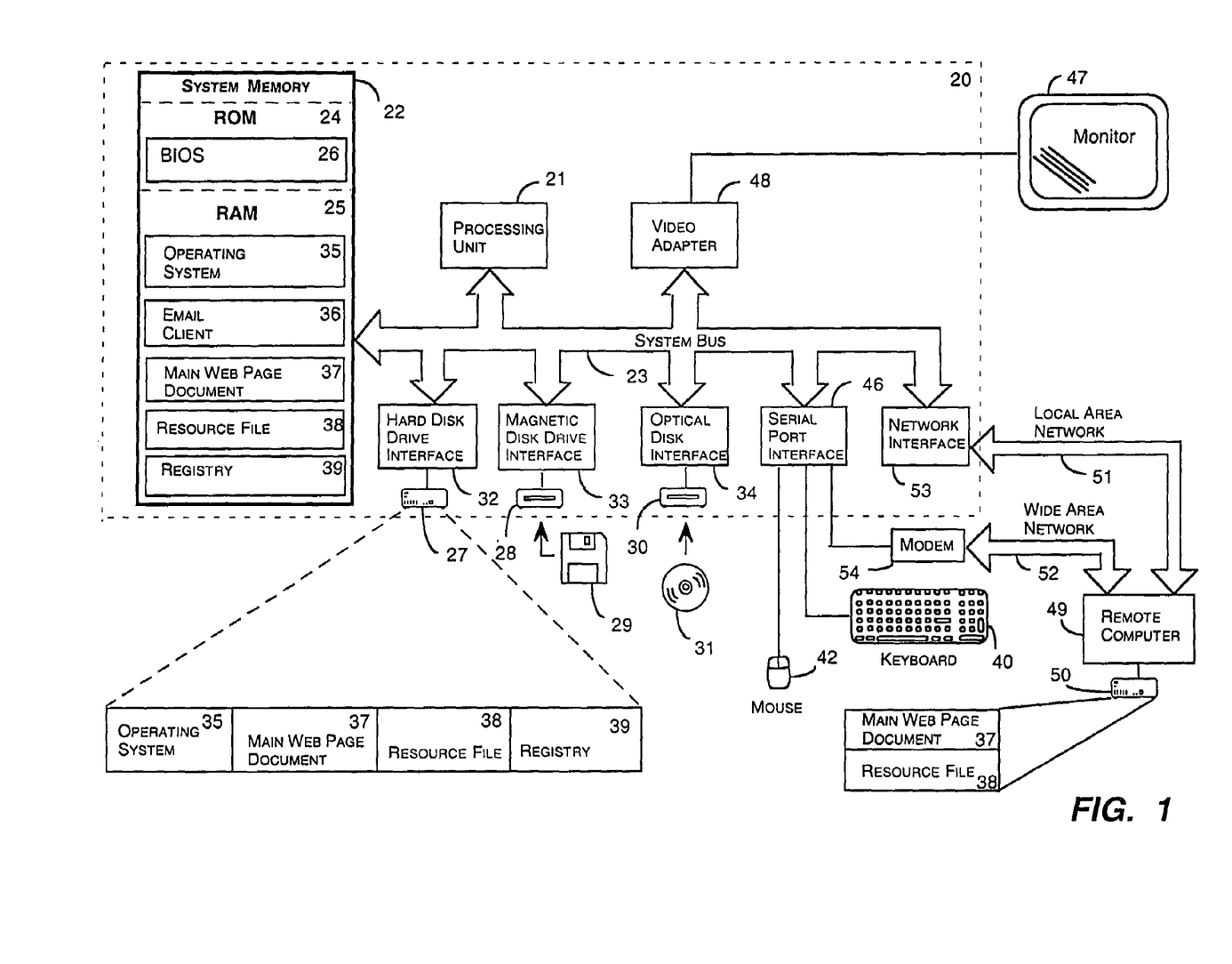
FIG. 1 is a block diagram of a computer system that provides the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more email client application programs 36, a main web page document (e.g., an HTML source file) 37, at least one resource file 38, and any number of other program modules, such as a Registry 39 maintained by the operating system 35 for storing, among other things, a user's preferences. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention is represented by the "MICROSOFT OUTLOOK" and "MICROSOFT OUTLOOK EXPRESS" email clients and HTML source file editors including the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, it should be understood that the present invention can be implemented by various program modules and/or application programs for use with various operating systems.

A Method for Sending a Web Page to a Recipient

Figure 2:
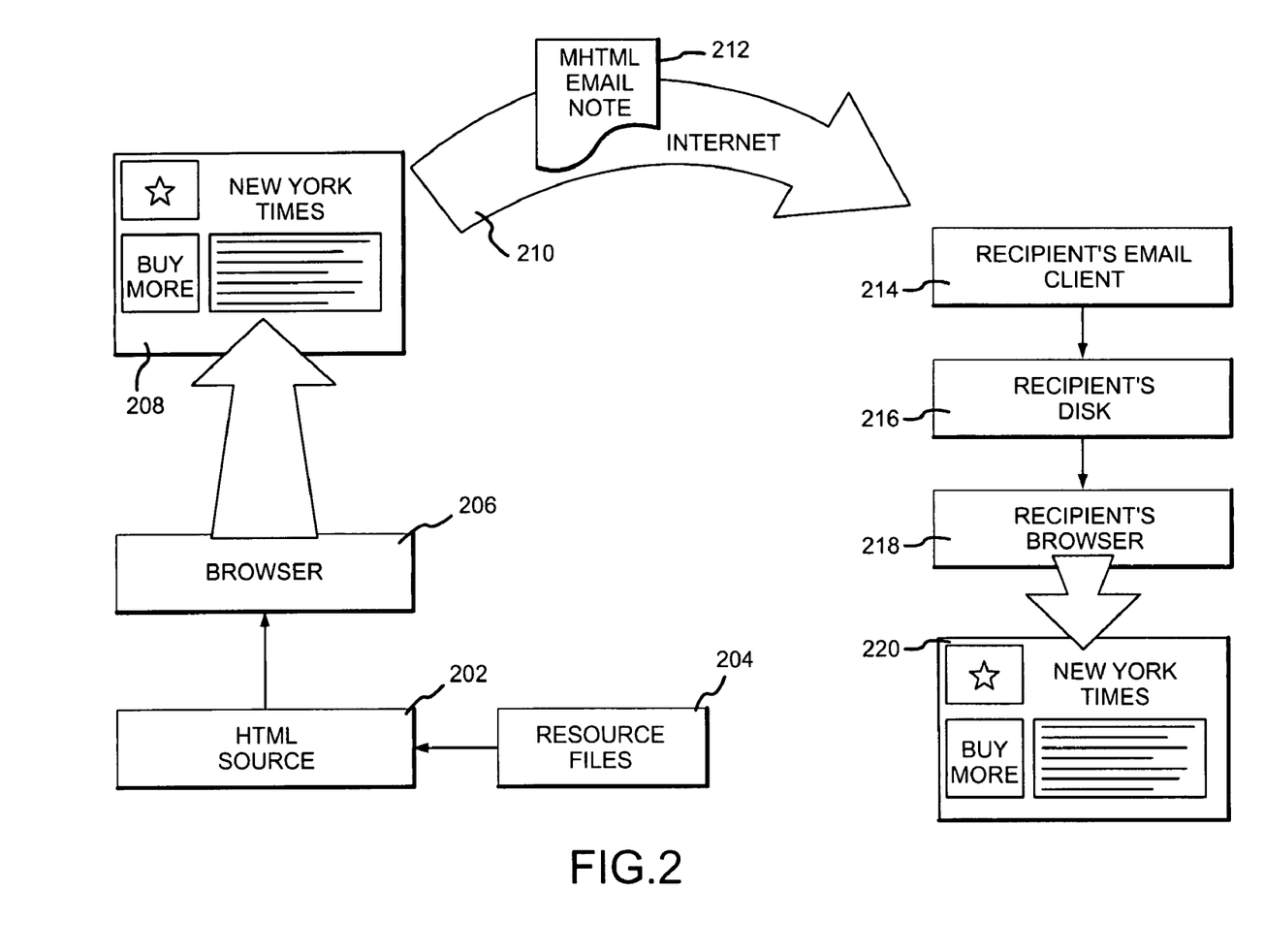
FIG. 2 is a block diagram depicting an exemplary flow path for a web page that is sent via email to a recipient.

Turning now to FIG. 2, a block diagram is shown, depicting an exemplary flow path for a web page that is sent via email to a recipient. As is known to those skilled in the art, a web page typically includes a main Hypertext Markup Language (HTML) source file 202 and at least one resource file 204. The HTML source file can be loaded into a browser 206 and displayed as a displayed page 208 on a display device, such as a computer monitor. The displayed page 208 is simply a graphical representation of the code contained in the main HTML source file 202.

The code in the HTML source file will often include references or links to other objects that are stored in the resource files 204. While basic text is often stored directly in the HTML source file 202, resource files 204 typically contain the non-text components of the web page, such as graphics objects and sound objects. Often, resource files are maintained within a folder structure (not shown) and the main HTML source file 202 includes links to the locations of the resource files 204 within that folder structure. Because any given resource file may be in a folder that is different than the folder containing the main HTML source file 202, the links in the main HTML source file 202 will not be functional, unless the resource files 204 are maintained in a location that is accurately referenced by the links.

If a user wants to send only the HTML source file 202 via email, the user can simply save the main HTML source file as an HTML formatted document and attach the saved document to an email note. If the user would like to send one or more resource files 204 associate with the main HTML source file 202, then the user can save and attach those files to the email note as well. Unfortunately, any folder structure that applied to the original web page will be lost and the links in the main HTML source file 202 may not function properly. To ensure that a functioning web page is delivered to the recipient, the user should "pack" the web page into a file structure that permits the web page to be stored with its resource files, such that the folder structure is maintained.

A method and system for packing a web page's main HTML source file 202 and all relevant resource files 204 into a single MHTML file is disclosed in a co-pending application, also assigned to Microsoft Corporation. That co-pending application has been assigned U.S. patent application Ser. No. 09/587,756, filed Jun. 6, 2000, The co-pending application is hereby incorporated by reference.

Once the web page and its associated resource files have been packed (or a decision has been made to send only the main HTML source file 202), the web page is sent in an email note 212 over the Internet 210 to a recipient's email client 214. After the email note 212 is received, it can be "unpacked" (as disclosed in the above-referenced co-pending application) and saved on the recipient's disk 216. A properly packed and unpacked web page can be saved on the recipient's disk 216 with a functional folder structure for the applicable resource files 204. The recipient's browser 218 can then access the main HTML source file 202 and the resource files 204 from the recipient's disk 216 to display the received displayed page 220.

Figure 3A:
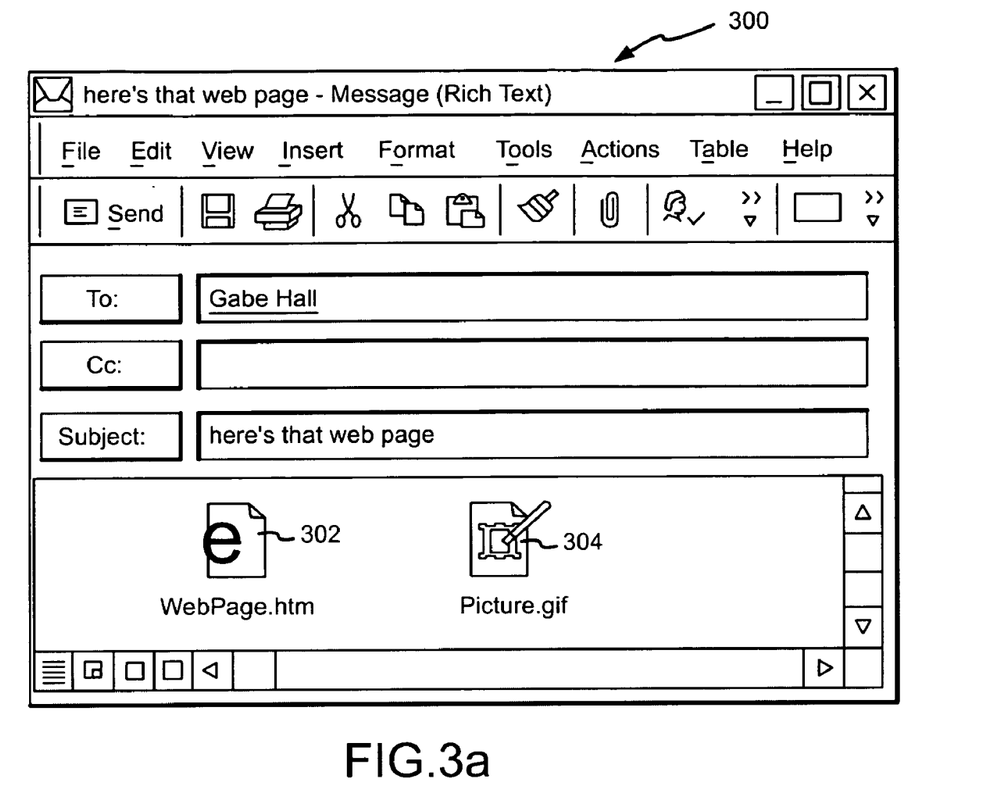
FIG. 3*a* depicts a web page and a resource file attached to an email note in a conventional manner.
Figure 3B:
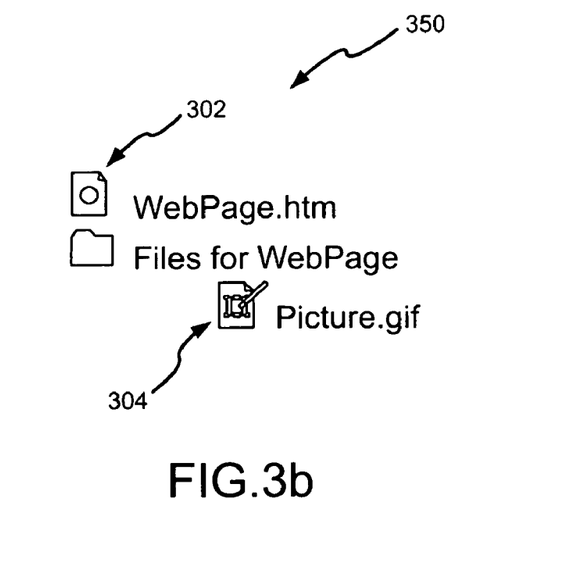
FIG. 3*b* depicts a conventional folder structure for maintaining a web page and a resource file.

Turning now to FIG. 3a, an email note 300 is shown with two attached files 302, 304. The email note contains a file named WebPage.htm 302, which is a main HTML source file. The email note also contains a file named Picture.gif 304, which is a resource file referenced by a link in WebPage.htm 302. FIG. 3b depicts a typical folder structure 350 that contains a web page that is made up of main HTML source file WebPage.htm 302 and resource file Picture.gif 304. In this folder structure, the Picture.gif 304 file is in a subfolder of the folder in which the main HTML source file WebPage.htm 302 resides. The subfolder is named "Files for WebPage."

Links in the main HTML source file WebPage.htm 302 can be relative or absolute. Relative links point to resource files in locations relative to the main HTML source file. For example, in the folder structure depicted in FIG. 3b, a relative link to Picture.gif 304 in WebPage.htm 302 would look have the following form:

<img src="Files for Web Page/Picture.gif">.

With a relative link, an assumption is made that the link starts with the same folder in which the main HTML source file is located. Any folders listed in the link (here, "Files for Web Page") are assumed to be subfolders of the main HTML source file's folder. Absolute links point to a specific location on a server of other storage means. For example, an absolute link for Picture.gif 304 might be:

img src="http://Server/Files for Web Page/Picture.gif">, which points to a specific folder (here, "Files for Web Page") at a specific location on a particular server (here, "Server").

The web page packing method and system disclosed in the above-referenced co-pending patent application provides a means for maintaining the file structure of a web page and its resource files, regardless of whether the links in the web page are relative or absolute. In short, the packing aspect of the invention of the co-pending patent application saves the main HTML source file and all of its resource files in a single file. The web page that is packed into this single file is said to be stored in a "Web Archive" format. In an exemplary embodiment of the present invention, a Web Archive format is a MHTML (Multipurpose Internet Mail Extensions encapsulated HTML) format, but could be any format that permitted the packing of a web page and all accompanying resource files into a single file for email transmission.

In an exemplary embodiment of the above-referenced packing method and system, the folder structure of FIG. 3b could be maintained in the Web Archive format so that the links and the web page function. Accordingly, when the recipient of an email note with an attached web page in Web Archive format opens the note, the attachments (main HTML source file and all resource files) will all be contained in a single file.

An exemplary embodiment of the present invention is directed to a method and system for automatically packing a web page and all accompanying resource files into a single Web Archive format file, so that the packing is transparent to the user. That is, the user is able to simply select a web page for sending via email and the packing is performed automatically, in most cases without further instructions from the user. As discussed above, the packing process can determine all resource files required by the web page and can store all of those resource files with the packed web page in the Web Archive format, so that the recipient receives a web page with functioning links.

A Method for Automatically Packing a Web Page

Figure 4:
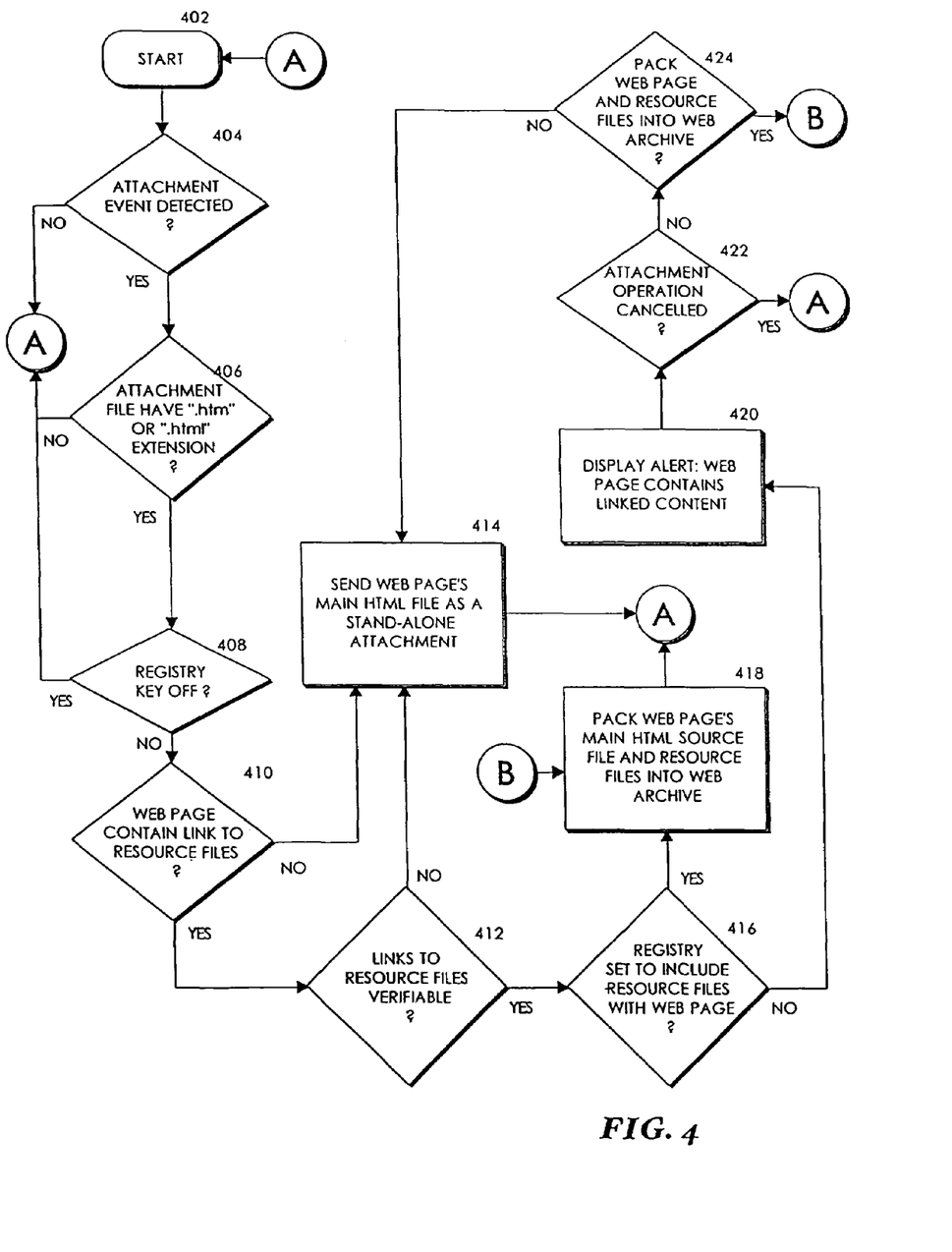
FIG. 4 is a flowchart depicting a method for automatically packing an HTML web page into a single MHTML file attachment to an email note in an exemplary embodiment of the present invention.

FIG. 4 depicts a flowchart of a method for automatically packing a web page, that is an exemplary embodiment of the present invention. The method starts at step 402 and proceeds to step 404. At step 404, a determination is made as to whether an attachment event has occurred. This determination can be made by an email client, such as MICROSOFT OUTLOOK, or by some other monitoring object. The email client will detect an attachment event when the user attempts to attach or enclose a file with the email note. Examples of attachment events include: (1) the user dragging one or more files to an email note from another location; (2) a user choosing "Insert File" and inserting one or more files into an email note; and (3) a user copying one or more files from some location and pasting them into an email note. If the email client does not detect an attachment event, the method branches back to step 402 and the email client continues to monitor for attachment events. On the other hand, if a determination is made at step 404 that an attachment event has occurred, the method proceeds to decision block 406.

At decision block 406, a determination is made as to whether the attached file includes an ".htm" or ".html" extension. The email client can make this determination. If the file does not have one of these extensions, the method proceeds back to step 402 and attachment event monitoring continues. If, on the other hand, the attached file includes one of these extensions, the method proceeds to decision block 408 wherein a determination is made as to a web page packing registry key has been turned off. The web page packing registry key can reside in an operating system registry and provides a means for recalling a user's preference as to whether a web page packing should be enabled. If the web page packing registry key is off, the user has indicated that the user does not wish for the email client to pack web pages. If the web page packing registry key is off, the method branches back to step 402, via connector A, and attachment event monitoring continues.

If the web page packing registry key is on, this indicates that the user has enabled the packing of web pages by the email client. In this case, the method branches to step 410 and a determination is made as to whether the web page to be attached includes a link to a resource file. Obviously, if the web page does not include a link, then packing is unnecessary and the method branches to step 414 and the web page's HTML source file is attached as a stand-alone file.

The email client can determine whether the web pages HTML source file contains a link to a resource file (linked content) by at least two methods. Some web page editors (such as MICROSOFT OFFICE WEB PAGE EDITORS) embed a tag into any HTML file that has associated resource files. Typically, the tag will take the form "<link rel=FileList href= . . . >". If the HTML file includes this tag, then the email client will know that the HTML file includes links to resource files.

Other email clients will not embed this tag, but the determination as to whether content links exist in the HTML source file can be made by scanning and HTML page for typical links, such as "<img src= . . . >", "<frame src=0 . . . >", etc. The list of tags that would most commonly be searched for is disclosed in the above-identified co-pending application.

If the HTML source file contains a link to at least one resource file, the method will branch from decision block 410 to decision block 412. At decision block 412, a determination is made as to whether each link to resource files is verifiable. A link is verifiable if the location identified in the link can be found and, in fact, identifies an existing resource file. If the links are not verifiable, the method branches to step 414 and the HTML source file is sent as a stand alone attachment to the email note. On the other hand, if the links are verifiable, the method branches to decision block 416.

At decision block 416, a determination is made as to whether an automatic packing registry key is set to indicate that the user desires the automatic inclusion of resource files as a single Web Archive file attachment to the note. If the user has indicated that the user desires resource files to be automatically included (i.e., without any further prompts to the user), the method branches to step 418 and the web page and its accompanying resource files are packed into a single file as described above. The packing process can create and store the Web Archive file containing the main HTML source file and the resource files in a temporary directory. After the Web Archive file has been created and stored in the temporary directory, the file can be attached to the email note for transmission in the conventional manner. A progress dialog box can also be displayed to the user to indicate the progress of the packaging process.

If at decision block 416 a determination is made that the user has not indicated in the registry that web page attachments to email notes should automatically pack resource files, the method branches to step 420. At step 420, an alert is displayed to the user which indicates that at least one of the web pages that has been selected to be attached to the email note includes links to resource files (i.e., contains linked content). The user is also prompted to decide whether the user desires to send the resource files with the web page (i.e., save together and attach as a single Web Archive file). The method branches to step 422 and a determination is made as to whether the user selects to cancel the attachment operation. If the user selects to cancel the attachment operation, the method branches to step 402 through connector "A" and attachment event monitoring continues. If on the other hand, the user does not cancel the attachment operation, then the method branches to decision block 424 and a determination is made as to whether the user desires to include the resource files with the web page as a single Web Archive file. If the user selects to pack and attach the Web Archive file, then the method branches to step 418, via connector "B", and the Web Archive file is packed and attached. Once the Web Archive file has been packed and attached, the method branches back to step 402 via connector "A" and attachment event monitoring continues.

If, at decision block 424, the determination is made that the user does not desire to attach the Web Archive file, then the method branches to step 414 and the main HTML source file is sent as a stand alone attachment with the email note. The method then branches to decision block 402 via connector "A" and attachment monitoring continues.

It will be appreciated by those skilled in the art that the packaged web page (main HTML source file) and resource files need not be stored and transmitted in MHTML format. That format is simply the conventional format for transmitting email notes. The inventors contemplate that any single file format capable of maintaining a folder structure would be suitable to implement an exemplary embodiment of the present invention.

A Method for Configuring Automatic Web Archive Packing

In an exemplary embodiment of the present invention, a user may indicate the user's preferences as to whether web page packing should be enabled and, if so, whether web page packing should be done automatically (i.e., without requesting the user's specific authorization). As discussed above, in connection with FIG. 4, two registry keys can be maintained in the Registry 39 (FIG. 1) to store the user's web page packing preferences. A first registry key, the web page packing key enables or disables web page packing. If this registry key is set to "off," then the user will never be prompted as to whether the user wishes for linked resource files to be packed with the web page into a single web archive file and no web page packing will occur. If this registry key is set to "on," then web page packing will be enabled and web page packing can occur either automatically or after prompting the user and receiving authorization.

The automatic packing registry key is a second registry key that pertains to web page packing. As discussed in connection with FIG. 4, this registry key can be used to determine whether web page packing will be done automatically or will require further user authorization. If this registry key is set to "off," then the user will be prompted to authorize web page packing when links to resource files have been detected in the web page's main HTML source file. If this registry key is set to "on," then automatic web page packing will be performed in response to the detection of an attachment event and of linked resource files, as discussed above, in connection with FIG. 4.

Figure 5:
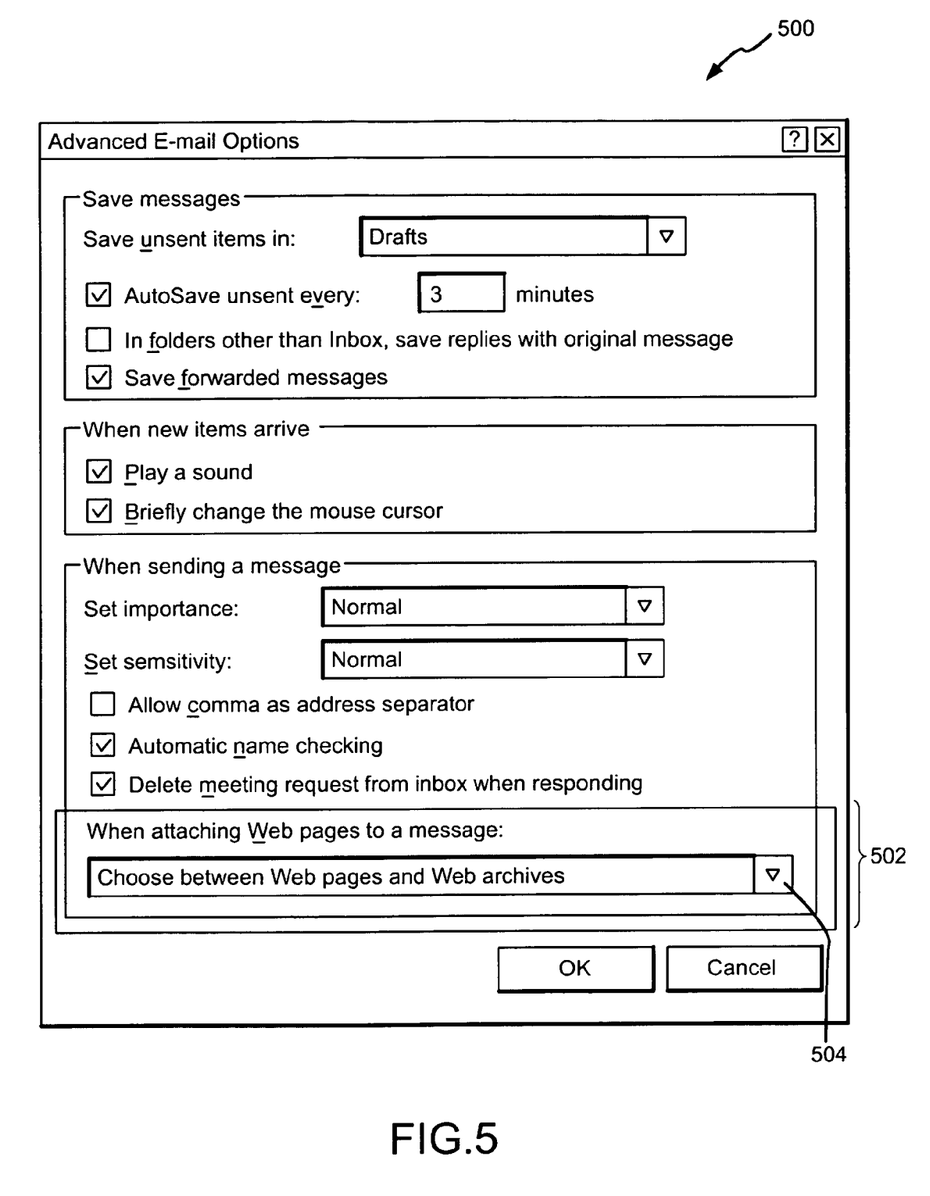
FIG. 5 is an email options dialog box for configuring an exemplary embodiment of the present invention.

Turning now to FIG. 5, an email options dialog box 500 is depicted from an exemplary embodiment of the present invention. This email options dialog box 500 may be access from the "Preferences" menu in the user's email client. The email options dialog box 500 can be used to set or change the web page packing registry key. The email options dialog box 500 includes a web page packing options area 502 which permits the user to set both the web page packing registry key and the automatic packing registry key.

The user can select between three settings by clicking on the toggle button 504. When the user clicks on the toggle button 504, the email options dialog box 500 displays three choices which are selectable by the user:

1. Choose between web pages and Web Archives
2. Attach the web pages as single files
3. Attach the web pages as Web Archives If the user selects option 1, the email client will prompt the user to choose between transmitting an attached web page in HTML source file format and transmitting the web page as a single Web Archive file, including the HTML source file and all accompanying resource files in Web Archive format.

If the user selects option 2, the email client will attach the web page's main HTML source file as a single attachment without prompting the user for authorization. Similarly, if the user selects option 3, the email client will attach the web page as a single Web Archive file, including the HTML source file and all accompanying resource files in Web Archive format without prompting the user for authorization.

If the user selects option 1, then the web packing registry key will be set to "on" and the automatic packing registry key will be set to "off." If the user selects option 2, then the web page packing registry key will be set to "off" and the automatic packing registry key is unaffected. If the user selects option 3, then the web page packing registry key will be set to "on" and the automatic packing registry key will be set to "on."

Figure 6:
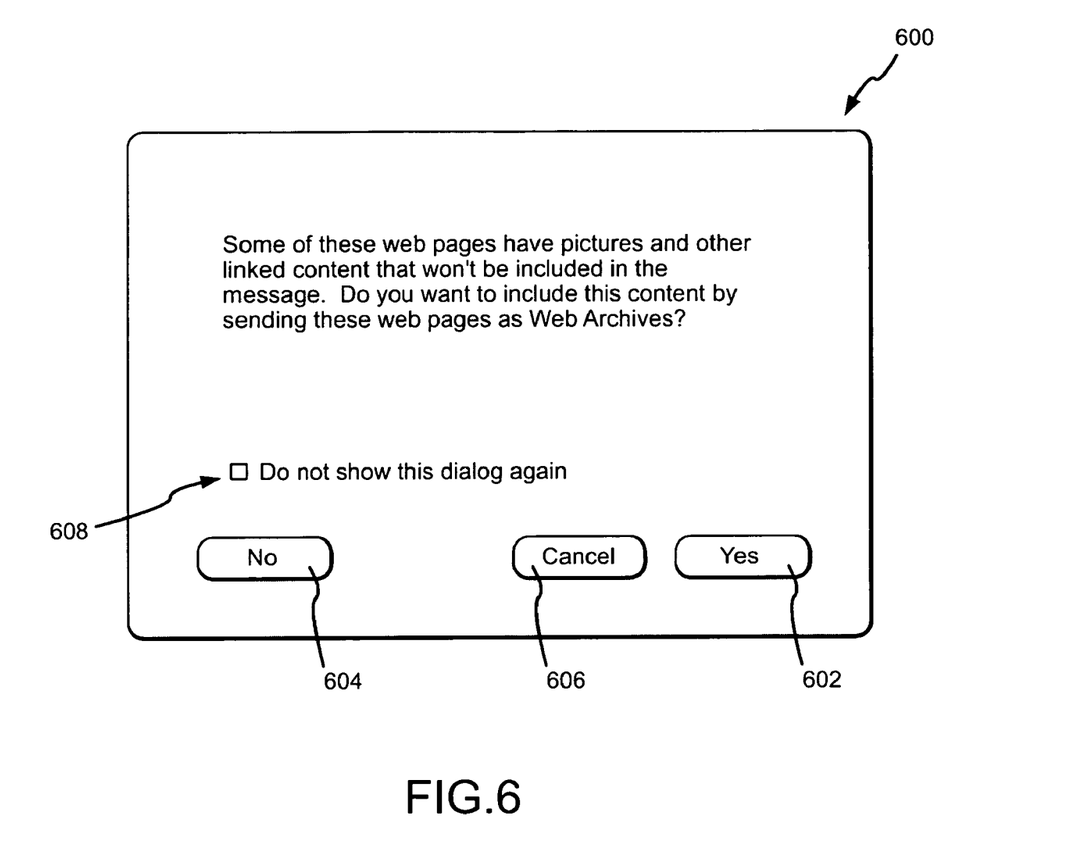
FIG. 6 is an alert dialog box for configuring an exemplary embodiment of the present invention.

Turning now to FIG. 6, an alert dialog box 600 is depicted that is displayed by an exemplary embodiment of the present invention. The alert dialog box 600 will be displayed by the email client following the detection of an attachment event. Referring back to FIG. 4, the alert dialog box 600 is displayed when the "no" branch is followed from decision block 416. The queries of decision blocks 422 and 424 are included in the alert dialog box 600. The alert dialog box 600 is displayed when the user desires to attach a web page having links to resource files, but where the automatic packing registry key has been set to "off." In such a case, the display of the alert dialog box 600 notifies the user that the web page's resource files will not be sent, unless the user authorizes the email client to do otherwise.

If the user selects the "Yes" button 602, then the resource files will be packed with the web page into a single Web Archive file. If the user selects the "No" button 604, then the resource files will not be packed with the web page into a single Web Archive file and the web page's main HTML source file will be sent as a stand-alone attachment. If the user selects the "Cancel" button 606, then the attachment operation is cancelled.

If the user checks the "Do not show me this dialog again" checkbox 608, then the registry can be modified to reflect the user's choice. If the user selects the "Yes" button 602 and checks checkbox 608, then the automatic packing registry key will be set to "on" and the web page packing registry key will be set to "on." Subsequently, the alert dialog box 600 will not be displayed in response to an attachment event and web pages will be automatically packed with accompanying resource files for transmission. If the user selects the "No" button 602 and checks checkbox 608, then the automatic packing registry key will be set to "off" and the web page packing registry key will be set to "off." Subsequently, the dialog box will not be displayed in response to an attachment event and web pages will not be packed with accompanying resource files. Of course, the user can reset both registry keys by invoking the email options dialog box 500 of the "Preferences" menu in the user's email client, as discussed above in connection with FIG. 5.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for automatically attaching a web page as a single file to an email note, the method comprising the steps of:

in response to an attachment event, determining whether a selected file is a web page;

in response to a determination that the selected file is a web page, determining whether the selected file includes at least one link to at least one resource file; and in response to a determination that the selected file includes at least one link to at least one resource file, packing the selected file and the at least one resource file into a single attachment file and attaching the attachment file to the email note.

2. The method of claim 1, wherein the attachment event comprises a user dragging the selected file into the email note.

3. The method of claim 1, wherein the attachment event comprises a user dragging the selected file into the email note.

4. The method of claim 1, wherein the attachment event comprises a user copying the selected file into the email note.

5. The method of claim 1, wherein the step of determining that the selected file is a web page comprises determining whether the selected file has an ".htm" extension.

6. The method of claim 1, wherein the step of determining that the selected file is a web page comprises determining whether the selected file has an ".html" extension.

7. The method of claim 1, wherein the step of determining that the selected file includes at least one link to at least one resource file comprises determining whether the selected file includes a tag including the string: <ling rel=FileList href=>.

8. The method of claim 1, wherein the step of determining that the selected file includes at least one link to at least one resource file comprises determining whether the selected file includes a link tag selected from the group of:
    <img scr=>;
    <img lowsrc=>;
    <img dynsrc=>;
    <body background=>;
    <script src=>;
    <bgsound src=>;
    <embed src=>; and
    <link rel="stylesheet">.

9. The method of claim 1, wherein the step of packing the selected file and the at least one resource file into a single attachment file comprises converting the selected file and the at least one resource file into an MHTML file.

10. A method for automatically attaching a web page as a single file to an email note, the method comprising the steps of:
    determining that a user desires to attach a selected file to the email note;
    determining whether the selected file is a web page;
    in response to a determination that the selected file is a web page, determining whether the selected file includes at least one link to at least one resource file; and
    in response to a determination that the selected file includes at least one link to at least one resource file, determining whether automatic attachment of the at least one resource file has been authorized; and
    in response to a determination that automatic attachment of the at least one resource file has been authorized, packaging the selected file and the at least one resource file into a single attachment file and attaching the attachment file to the email note.

11. The method of claim 10, wherein the step of determining that a user desires to attach a file to the email note comprises determining that a user has dragged the selected file into the email note.

12. The method of claim 10, wherein the step of determining that a user desires to attach a file to the email note comprises determining that a user has inserted the selected file into the email note.

13. The method of claim 10, wherein the step of determining that a user desires to attach a file to the email note comprises determining that a user has copied the selected file into the email note.

14. The method of claim 10, wherein the step of determining that the selected file is a web page comprises determining whether the selected file has an ".htm" extension.

15. The method of claim 10, wherein the step of determining that the selected file is a web page comprises determining whether the selected file has an ".html" extension.

16. The method of claim 10, wherein the step of determining that the selected file includes at least one link to at least one resource file comprises determining whether the selected file includes a tag including the string: <link rel=FileList href=>.

17. The method of claim 10, wherein the step of determining that the selected file includes at least one link to at least one resource file comprises determining whether the selected file includes a link tag selected from the group of:
    <img src=>;
    <img lowsrc=>;
    <img dynsrc=>;
    <body background=>;
    <script src=>;
    <bgsound src=>;
    <embed src=>; and
    <link rel="stylesheet">.

18. The method of claim 10, wherein the step of determining whether automatic attachment of the at least one resource file has been authorized comprises determining the status of at least one registry key.

19. The method of claim 18, wherein the step of determining the status of at least one registry key comprises determining the status of a web page packing registry key.

20. The method of claim 19, wherein the step of determining the status of at least one registry key comprises determining the status of an automatic packing registry key.

21. The method of claim 10, wherein the step of packing the selected file and the at least one resource file into a single attachment file comprises converting the selected file and the at least one resource file into an MHTML file.

22. A system for automatically attaching a web page as a single file to an email note, the system comprising:
    an email client for generating and transmitting an email note;
    a web page with at least one link to at least one resource file;
    a web page packing object operative to pack the web page and at least one resource file into a single web archive file;
    wherein the email client is operative to detect the attachment of the web page to the email note and to automatically trigger the web page packing object to pack the web page and at least one resource file into the single web archive file.

23. The system of 22, wherein the at least one link comprises a tag including the string: <link rel=FileList href=>.

24. The system of 22, wherein the at least one link comprises a link tag selected from the group of:
    <img src=>;
    <img lowsrc=>;
    <img dynsrc=>;
    <body background=>;
    <script src=>;
    <bgsound src=>;
    <embed src=>; and
    <link rel="stylesheet">.

25. The system of 22, wherein the single web archive file comprises an MHTML file.

26. The system of 22, wherein the attachment of the web page to the email note comprises a user dragging the web page into the email note.

27. The system of 22, wherein the attachment of the web page to the email note a user inserting the web page into the email note.

28. The system of 22, wherein the attachment of the web page to the email note comprises a user copying the web page into the email note.

29. A method for automatically attaching a web page as a single file to an email note, the method comprising the acts of:
 detecting an attachment event indicating a selected file is to be attached to the email note;
 determining whether the selected file is a web page;
 determining whether the selected file includes one or more links to resource files; and
 in response to a determination that the selected file includes one or more links to resource files, packing the selected file and the one or more resource files into a single attachment file and attaching the attachment file to the email note.

30. The method of claim 29 further comprising:
 determining whether automatic attachment of resource files for the web page has been authorized.

31. The method of claim 30 wherein the acts of packing and attaching are in response to both a determination that attachment of resource files has been authorized and to the determination that the selected file includes one or more links to resource files.

32. The method of claim 31, wherein the act of determining that the selected file includes one or more links to resource files comprises determining whether the selected file includes one or more link tags.

33. The method of claim 31, wherein the act of determining whether automatic attachment of the at least one resource file has been authorized comprises determining the status of at least one registry key.

34. The method of claim 33, wherein the act of determining the status of at least one registry key comprises determining the status of a web page packing registry key.

35. The method of claim 33, wherein the act of determining the status of at least one registry key comprises determining the status of an automatic packing registry key.

* * * * *